United States Patent [19]

Garde et al.

[11] Patent Number: 5,254,308

[45] Date of Patent: Oct. 19, 1993

[54] ZIRCONIUM ALLOY WITH IMPROVED POST-IRRADIATION PROPERTIES

[75] Inventors: Anand M. Garde, West Simsbury; Satya R. Pati, Simsbury, both of Conn.

[73] Assignee: Combustion Engineering, Inc., Windsor, Conn.

[21] Appl. No.: 996,567

[22] Filed: Dec. 24, 1992

[51] Int. Cl.$^5$ .............................................. C22C 16/00
[52] U.S. Cl. ..................................... 420/422; 148/672
[58] Field of Search ......................... 420/422; 148/672

[56] References Cited

U.S. PATENT DOCUMENTS

| | | | |
|---|---|---|---|
| 4,648,912 | 3/1987 | Sabol et al. | 148/672 |
| 4,649,023 | 3/1987 | Sabol et al. | 420/422 |
| 4,675,153 | 6/1987 | Boyle et al. | 376/416 |
| 4,879,093 | 11/1989 | Garde | 420/422 |
| 4,938,920 | 7/1990 | Garzarolli et al. | 420/422 |
| 4,963,323 | 10/1990 | Matsuo et al. | 420/422 |
| 4,992,240 | 2/1991 | Komatsu et al. | 420/422 |
| 5,023,048 | 6/1991 | Mardon et al. | 376/416 |
| 5,112,573 | 5/1992 | Foster et al. | 420/422 |
| 5,125,985 | 6/1992 | Foster et al. | 148/672 |

OTHER PUBLICATIONS

Eucken C. M., Finden, P. T., Trapp-Pritsching, S. and Weidinger, H. G., "Influence of Chemical Composition on Uniform Corrosion of Zirconium Base Alloy in Autoclave Tests" Zirconium in the Nuclear Industry Eighth International Symposium, ASTM STP 1023, L. F. P., Van Swam and C. M. Eucken, Eds.; American Society for Testing and Materials, Philadelphia, 1989, pp. 113-127.

McInteer, W. A., Baty, D. L. and Stein, K. O., "The Influence of Tin Content on the Thermal Creep of Zircaloy-4", Zirconium in the Nuclear Industry, Eighth International Symposium, ASTM STP 1023, L. F. P. Van Swam and C. M. Eucken, Eds.; American Society for Testing and Materials, Philadelphia, 1989 pp. 621-640.

Scott, D. B., "Notes on the Corrosion Behavior of Zircaloy-2 with Various Levels of Iron Content," Zirconium Highlights, WAPD-ZH-24, p. 11, (1960).

Isobe, T. and Matsuo, Y., "Development of High Corrosion Resistant Zirconium-base Alloys", Zirconium in the Nuclear Industry: Ninth International Symposium, ASTM STP 1132, C. M. Eucken and A. M. Garde, Eds. American Society for Testing Materials, Philadelphia, 1991, pp. 346-367.

Primary Examiner—Upendra Roy
Attorney, Agent, or Firm—Ronald P. Kananen; John H. Mulholland

[57] ABSTRACT

A stabilized alpha metal matrix provides an improved ductility, creep strength, and corrosion resistance against irradiation in a zirconium alloy containing tin in a range of 0.45 to 0.75 wt. %, and typically 0.6 wt. %; iron in a range of 0.4 to 0.53 wt. %, and typically 0.45 percent; chromium in a range of 0.2 to 0.3 wt. %, and typically 0.25 percent; niobium in a range of 0.3 to 0.5 wt. %, and typically 0.45 wt. %; nickel in a range of 0.012 to 0.03 wt. %, and typically 0.02 wt. %; silicon in a range of 50 to 200 ppm, and typically 100 ppm; and oxygen in a range 1,000 to 2,000 ppm, and typically 1,600 ppm, with the balance zirconium. The addition of iron and niobium improves mechanical properties of the alloy with its lower level of tin, while corrosion resistance is addressed by having an iron level of 0.45 wt. % and an iron/chromium ratio on the order of 1.5. The addition of niobium also counters the effect of higher iron on the hydrogen absorption characteristics of the alloy. The addition of nickel, silicon, carbon, and oxygen as alloying elements provide desired corrosion resistance and strength.

21 Claims, No Drawings

ZIRCONIUM ALLOY WITH IMPROVED POST-IRRADIATION PROPERTIES

BACKGROUND OF THE INVENTION

This invention relates to alloys for use in light water nuclear reactor (LWR) core structural components and fuel cladding. More particularly, this invention relates to a zirconium alloy for such use which exhibits superior corrosion resistance and mechanical properties after irradiation. Still more particularly, this invention relates to a zirconium alloy with improved corrosion resistance and irradiated ductility by controlling its alloy composition to within particular ranges.

DESCRIPTION OF THE PRIOR ART

Zirconium alloys are used in the fuel assembly structural components of nuclear reactors, such as in fuel rod cladding, guide or thimble tubes, grid strips, instrument tubes, and so forth because of their low neutron cross section, good corrosion resistance against high pressure/high temperature steam and water, good mechanical strength, and fabricability. Zirconium alloys, particularly those commonly known as Zircaloy-2 and Zircaloy-4 have been used in light water reactor cores because of their relatively small capture cross section for thermal neutrons. The addition of 0.5 to 2.0 percent by weight niobium and up to 0.25 percent of a third alloying element to these zirconium alloys for purposes of corrosion resistance in the reactor core is suggested in U.S. Pat. No. 4,649,023 as part of a teaching of producing a microstructure of homogeneously disbursed fine precipitates of less than about 800 angstroms. The third alloying element is a constituent such as iron, chromium, molybdenum, vanadium, copper, nickel and tungsten.

Pellet-clad interaction (PCI) resistance is sought in U.S. Pat. Nos. 4,675,153 and 4,664,831 by use of zirconium-based alloys including "zirconium-2.5 w/o niobium". The latter teaching also refers to "Zr-Nb alloys containing about 1.0 to 3.0 w/o Nb". In these patents, oxygen is present "below about 350 ppm of said alloy".

U.S. Pat. No. 4,648,912 teaches improving high temperature corrosion resistance of an alpha zirconium alloy body by rapidly scanning the surface of the body with a laser beam. The alloy treated included zirconium-niobium alloys. Thus, it has been found by various investigators in the prior art literature that the addition of niobium to a zirconium alloy for use in light water reactors will reduce hydrogen uptake from waterside corrosion, stabilize alloying element irradiation defect complexes, and make the alloy more resistant to annealing of irradiation damage. It is also reported by investigators that niobium will enhance work hardenability of irradiated Zircaloy but that an addition of niobium above the 1 percent level will not result in further additional benefit in mechanical properties.

An improved ductile irradiated zirconium alloy is described in U.S. Pat. No. 4,879,093 issued to an inventor in this application. The alloy has a stabilized microstructure which minimizes loss of alloy ductility required to resist release of fission gases and to spent fuel safely. The alloy retains a reasonable corrosion resistance in both pressurized water reactors (PWR) and boiling water reactors (BWR) because of its optimum intermetallic precipitate average particle size. The alloy of the '093 patent is based on an alpha phase zirconium-tin-niobium or alpha phase zirconium-tin-molybdenum alloy having characteristics as shown in Table 1 of that patent with niobium, if present, in a range of from a measurable amount up to 0.6 percent by weight. The molybdenum, if present, is in a range of from a measurable amount up to 0.1 percent by weight. The zirconium-tin system is known as "Zircaloy" and, typically, if Zircaloy-4, for example, would also have 0.18 to 0.24 percent by weight iron, 0.07 to 0.13 percent by weight chromium, oxygen in the range of from 1,000 to 1,600 ppm, 1.2 to 1.7 percent by weight tin, and the remainder zirconium.

U.S. Pat. No. 4,992,240 discloses another zirconium alloy containing on a weight basis, 0.4 to 1.2% tin, 0.2 to 0.4% iron, 0.1 to 0.6% chromium, not higher than 0.5% of niobium, and balance zirconium, wherein the sum weight proportions of tin, iron and chromium is in the range of 0.9 to 1.5%. Oxygen, according to FIG. 4 of the '240 patent, is about 1,770 ppm to 1,840 ppm. Niobium is apparently optional, and silicon is not reported.

Recent trends in the nuclear industry include shifts toward higher coolant temperatures to increase the thermal efficiency and toward higher fuel discharge burnups to increase the fuel utilization. Both the higher coolant temperatures and discharge burnups tend to increase the in-reactor corrosion and hydrogen uptake of the zirconium alloys. The high levels of neutron fluence and simultaneous hydrogen pickup degrade the ductility of zirconium alloys. For these more demanding service conditions, it is therefore necessary to improve the corrosion resistance and irradiated ductility of zirconium alloys.

Accordingly, it is a continuing problem in this art to develop a zirconium alloy having superior ductility after irradiation; good corrosion resistance, especially independent of processing history; reduced hydrogen absorption by the alloy; and a significant solid solution alloy strength.

It is another continuing general problem in this art to improve the corrosion resistance and irradiated ductility of zirconium alloys used in fuel assembly structural components in nuclear reactors.

DESCRIPTION OF THE PREFERRED EMBODIMENTS

It is an object of this invention, therefore, to provide a zirconium alloy with improved corrosion resistance.

It is an additional object of this invention to provide a zirconium alloy with an improved irradiated ductility.

It is still another object of this invention to provide a zirconium alloy with improved corrosion resistance and irradiated ductility.

It is yet another object of this invention to provide a zirconium alloy with a predetermined alloy composition for improving corrosion resistance and irradiated ductility.

The invention is based upon the theory that ductility after irradiation is improved by selecting the composition of the alloy such that, as far as possible, an addition of the different levels of the alloying element does not result in precipitation of new phases in the microstructure apart from the usual zirconium-iron-chromium precipitates observed in commercial Zircaloy-4. The reasons for selecting specific levels of the different alloying elements are given below, and the composition of the alloy according to the invention is shown in Table 1.

The alloy of the present invention thus includes tin (Sn) in a range of 0.45 to 0.75 wt. %, wherein 0.6 wt. % is typical. The alloy also has iron (Fe) in a range of 0.4 to 0.53 wt. %, and typically 0.45 wt. %; chromium (Cr) in a range of 0.2 to 0.3 wt. % and typically 0.25 wt. %; niobium (Nb) in a range of from 0.3 wt. % to 0.5 wt. % and typically 0.45 wt. %; silicon in a range of 50 to 200 parts per million (ppm) and typically 100 ppm; carbon (C) in a range of 80 to 150 ppm and typically 100 ppm; oxygen (O) in a range of from 1,000 to 2,000 ppm and typically 1,600 ppm; and the balance zirconium.

TIN (SN)

A decrease in the tin level below the 1.2 percent lower limit in Zircaloy-4 improves its corrosion resistance.[1] For this reason, the tin level for the alloy of the invention is selected to be in the range of 0.45 to 0.75 wt. %. However, the trend of the mechanical property data regarding the influence of tin content on the thermal creep of zirconium alloys at 400° C. indicates that a decrease in tin level will degrade the creep resistance of zirconium alloys.[2] The selected range of the tin level of 0.45 to 0.75 wt. % tin is expected to provide a combination of good corrosion resistance and good creep resistance for the alloy of the invention and that the addition of niobium and iron as discussed below will improve the mechanical properties of the alloy of the invention.

IRON (Fe)

The corrosion resistance of Zircaloy-2 and iron alloys in both 360° C. water and 400° C. steam depends on the iron level.[3] While best corrosion resistance in 360° C. water was observed with 0.45 wt. % iron, the best corrosion resistance in 400° C. steam was observed at 0.25 percent iron. In order to achieve good corrosion resistance in both steam and water environments, an intermediate value of 0.4 wt. % to 0.53 wt. % Fe was selected for the new alloy of the invention. Since the results of 360° C. water autoclave corrosion tests correlate well with the in-PWR corrosion performance of zirconium alloys, typically 0.45 wt. % of iron is added to the proposed alloy of the invention.

CHROMIUM (Cr)

Chromium is mainly added to improve the strength and creep resistance of the new alloy. The (Fe+Cr) range up to 0.7 wt. % is useful in improving mechanical properties of the alloy without degradation of the corrosion resistance, according to the recent results of Isobe and Matsuo.[4] Moreover, for zirconium-tin-niobium alloys containing iron and chromium, a iron/chromium ratio of about 1.5 appears to give good corrosion resistance.[4] Thus, the chromium range of 0.2 to 0.3 wt. %, and typically 0.25 wt. %, was selected for the new alloy.

NIOBIUM (Nb)

The addition of niobium in an amount from a measurable amount to 0.5 wt. % and typically 0.45 wt. % is to improve the irradiated ductility of the new alloy,[5] to improve its corrosion resistance,[4] and to reduce hydrogen absorption.[5] The amount of niobium is limited to retain a predominantly single phase alpha structure of the alloy for superior corrosion resistance, mechanical properties, and good fabricability. It is known that higher levels of iron can increase the hydrogen uptake of the zirconium alloys. The addition of 0.45 wt. % niobium is expected to negate the effect of higher iron on the hydrogen absorption characteristics of the proposed alloy.

NICKEL (Ni)

Nickel is added in a range of 0.012 to 0.03 wt. %, and typically 0.02 wt. %, to enhance the high temperature corrosion resistance of the zirconium alloy.

SILCON (Si)

The silicon, in a range of 50 to 200 ppm, and typically at 100 ppm, is added as an alloying element to reduce the hydrogen absorption by the alloy and also to reduce the variation of the corrosion resistance with variations in the processing history of the alloy.(1)

CARBON (C)

Carbon is included in a range of 80 to 150 ppm, and typically at 100 ppm. High levels of carbon, i.e. greater than 200 ppm, degrade the in-PWR corrosion resistance of zirconium alloys and also increase the irradiation growth rate. Low levels of carbon, i.e. lower than 80 ppm result in parallel plate structure after beta quenching that degrades the fabricability of zirconium alloys. The selected range for the alloy of the invention of 80 to 150 ppm is expected to result in an alloy with good fabricability, low in-PWR corrosion rate, and low irradiation growth.

OXYGEN (O)

Oxygen, in a range of 1,000 to 2,000 ppm, and typically at 1,600 ppm, is added as a solid solution strengthening alloying element.

Thus, the invention of the new alloy described in this specification is expected to achieve good corrosion resistance, irradiated ductility, and reduced hydrogen absorption by its selected composition. The exposure of zirconium alloys to a water reactor environment results in irradiation damage to the microstructure and hydride precipitation. Both of these factors reduce the ductility and corrosion resistance of the irradiated alloys. The higher levels of alloying elements generally improve the strength and creep resistance of zirconium alloys with a concurrent degradation of the corrosion resistance. A new zirconium alloy, according to this invention, with optimum levels of tin, iron, chromium, niobium, nickel, silicon, carbon, and oxygen is proposed that should provide a good combination of mechanical properties and corrosion resistance after irradiation.

BIBLIOGRAPHY (1) Eucken C. M., Finden, P. T., Trapp—Pritsching, S. and Weidinger, H. G., "Influence of Chemical Composition on Uniform Corrosion of Zirconium Base Alloys in Autoclave Tests", *Zirconium in the Nuclear Industry Eighth International Symposium,* ASTM STP 1023, L. F. P, Van Swam and C. M. Eucken, Eds.; American Society for Testing and Materials, Philadelphia, 1989, pp. 113–127.

(2) McInteer, W. A., Baty, D. L. and Stein, K. O., "The Influence of Tin Content on the Thermal Creep of Zircaloy-4", *Zirconium in the Nuclear Industry, Eighth International Symposium,* ASTM STP 1023, L. F. P. Van Swam and C. M. Eucken, Eds.; American Society for Testing and Materials, Philadelphia, 1989 pp. 621–640.

(3) Scott, D. B., "Notes on the Corrosion Behavior of Zircaloy-2 with Various Levels of Iron Content," *Zirconium Highlights,* WAPD-ZH-24, p. 11, (1960).

(4) Isobe, T. and Matsuo, Y., "Development of High Corrosion Resistant Zirconium-base Alloys", *Zirconium in the Nuclear Industry*: Ninth International Symposium, ASTM STP 1132, C. M. Eucken and A. M. Garde, Eds., American Society for Testing Materials, Philadelphia, 1991, pp. 346-367.

(5) Garde, A. M., U.S. Pat. No. 4,879 093 "Ductile Irradiated Zirconium Alloy", issue date Nov. 7, 1989.

TABLE 1

Preferred Embodiment
Modified Zirconium Alloy

| | Range | Typical |
| --- | --- | --- |
| Tin, Wt. % | 0.45 to 0.75% | 0.6% |
| Iron, Wt. % | 0.4 to 0.53% | 0.45% |
| Chromium, Wt. % | 0.2 to 0.3% | 0.25% |
| Niobium, Wt. % | 0.3 to 0.5% | 0.45% |
| Nickel, Wt. % | 0.012 to 0.03% | 0.02% |
| Silicon, ppm | 50 to 200 ppm | 100 ppm |
| Carbon, ppm | 80 to 150 ppm | 100 ppm |
| Oxygen, ppm | 1000 to 2000 ppm | 1600 ppm |
| Zirconium | Balance | Balance |

We claim:

1. A zirconium alloy for use in light water nuclear core structure elements and fuel cladding, which comprises an alloy composition as follows:
   tin, in a range of 0.45 to 0.75 wt. %;
   iron, in a range of 0.4 to 0.53 wt. %;
   chromium, in a range of 0.2 to 0.3 wt. %
   niobium, in a range of 0.3 to 0.5 wt. %;
   nickel, in a range of 0.012 to 0.03 wt. %;
   silicon, in a range of 50 to 200 ppm;
   carbon, in a range of 80 to 150 ppm;
   oxygen, in a range of 1,000 to 2,000 ppm; and
   the balance being of zirconium.

2. The alloy composition as set forth in claim 1, wherein said tin is typically about 0.6 wt. %.

3. The alloy composition as set forth in claim 1, wherein said iron is typically about 0.45 wt. %.

4. The alloy as set forth in claim 1 wherein said chromium is about 0.25 wt. %.

5. The alloy as set forth in claim 1 wherein said niobium is about 0.4 wt. %.

6. The alloy as set forth in claim 1, wherein said nickel is about 0.02 wt. %.

7. The alloy as set forth in claim 1 wherein said silicon is about 100 ppm.

8. The alloy as set forth in claim 1 wherein said carbon is about 100 ppm.

9. The alloy as set forth in claim 1 wherein said oxygen is about 1,600 ppm.

10. A zirconium alloy for use in light water nuclear core structure elements and fuel cladding, which comprises a composition which includes tin in a range of 0.45 to 0.75 wt. % to improve corrosion resistance of said alloy in combination with iron in a range of 0.4 to 0.53 wt. % and niobium present in a range of a measurable amount up to 0.5 wt. %, said iron and said niobium acting in combination with said tin to improve the mechanical properties of said alloy, said niobium negating at least in part an increase of hydrogen uptake in said alloy as a result of said iron level; chromium in an amount determined by a ratio of iron/chromium of about 1.5, so that said chromium is in a range of 0.2 to 0.3 wt. %; and alloying elements including nickel in a range of 0.012 to 0.03 wt. % to enhance the high temperature corrosion resistance of the alloy, silicon in a range of 50 to 200 ppm to reduce the hydrogen absorption by the alloy and to reduce variation of corrosion resistance with variation in the processing history of the alloy, carbon in a range of 80 to 150 ppm for good fabricability, low in-PWR corrosion rate, and low irradiation growth, and oxygen in a range of 1,000 to 2,000 ppm as a solid solution strengthening alloying element; and the remainder zirconium.

11. The alloy composition as set forth in claim 10, wherein said tin is typically about 0.6 wt. %.

12. The alloy as set forth in claim 10 wherein said niobium is about 0.45 wt. %.

13. The alloy as set forth in claim 10, wherein said nickel is about 0.02 wt. %.

14. The alloy as set forth in claim 10 wherein said silicon is about 100 ppm.

15. The alloy as set forth in claim 10 wherein said carbon is about 100 ppm.

16. The alloy as set forth in claim 10 wherein said oxygen is about 1,600 ppm.

17. The alloy composition as set forth in claim 11, wherein said iron is typically about 0.45 wt. %.

18. The alloy as set forth in claim 11 wherein said chromium is about 0.25 wt. %.

19. A zirconium alloy consisting essentially of the following composition:
   tin, in a range of 0.45 to 0.75 wt. %;
   iron, in a range of 0.4 to 0.53 wt. %;
   chromium, in a range of 0.2 to 0.3 wt. %
   niobium, in a range of 0.3 to 0.5 wt. %;
   nickel, in a range of 0.012 to 0.03 wt. %;
   silicon, in a range of 50 to 200 ppm;
   carbon, in a range of 80 to 150 ppm;
   oxygen, in a range of 1,000 to 2,000 ppm; and
   the balance being of zirconium.

20. A zirconium alloy which comprises a composition consisting essentially of tin in a range of 0.45 to 0.75 wt. % to improve corrosion resistance of said alloy in combination with iron in a range of 0.4 to 0.53 wt. % and niobium present in a range of a measurable amount up to 0.5 wt. %, said iron and said niobium acting in combination with said tin to improve the mechanical properties of said alloy, said niobium negating at least in part an increase of hydrogen uptake in said alloy as a result of said iron level; chromium in an amount determined by a ratio of iron/chromium of about 1.5, so that said chromium is in a range of 0.2 to 0.3 wt. %; and further comprising alloying elements including nickel in a range of 0.012 to 0.03 wt. % to enhance the high temperature corrosion resist of the alloy, silicon in a range of 50 to 200 ppm to reduce the hydrogen absorption by the alloy and to reduce variation of corrosion resistance with variation in the processing history of the alloy, carbon in a range of 80 to 150 ppm for good fabricability, low in-PWR corrosion rate, and low irradiation growth, and oxygen in a range of 1,000 to 2,000 ppm as a solid solution strengthening alloying element; and the remainder zirconium.

21. The alloy composition as set forth in claim 20, consisting essentially of said alloying elements.

* * * * *